UNITED STATES PATENT OFFICE.

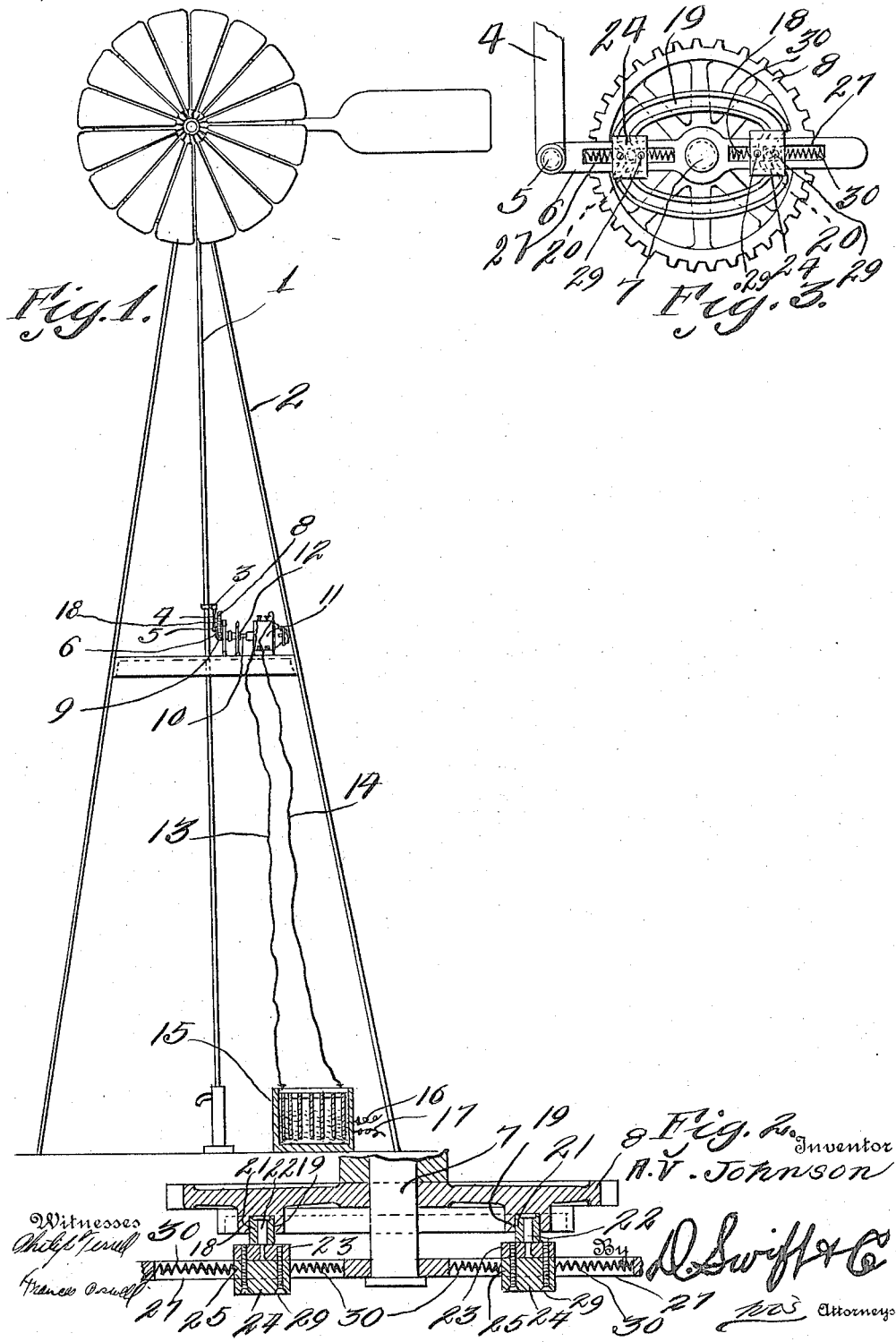

ARVID VICTOR JOHNSON, OF NAPOLEON, NORTH DAKOTA.

MEANS OF CONNECTION BETWEEN A WIND-WHEEL AND DYNAMO FOR STORING ELECTRICITY.

1,169,648.  Specification of Letters Patent.  Patented Jan. 25, 1916.

Application filed May 21, 1915. Serial No. 29,664.

*To all whom it may concern:*

Be it known that I, ARVID V. JOHNSON, a citizen of the United States, residing at Napoleon, in the county of Logan and State of North Dakota, have invented a new and useful Means of Connection Between a Wind-Wheel and Dynamo for Storing Electricity; and I do hereby declare the following to be a full, clear, and exact description of the invention, such as will enable others skilled in the art to which it appertains to make and use the same.

This invention relates to improved means of connection between a wind wheel operated rod and a dynamo to operate the dynamo for generating electricity, which is stored in a suitable storage battery, which has electrical connections with the dynamo.

It has been found that operating the dynamo too fast, or beyond its required speed the voltage and amperage rise, which will therefore burn out the armature and the commutator.

Therefore, in operating a dynamo by means of a wind wheel, which at times is operated faster than necessary, owing to heavy wind or gales in certain localities, it is the object of this invention to overcome the disadvantage of operating the dynamo too fast (which dynamo at such times may have been left in clutch with the operating means) and burn out the armature and commutator. To obviate or avoid this disadvantage it is the design of the invention to afford a yielding connection between the gear connections of the dynamo and the wind wheel operated rod, so as to yield or slip around, without operating the dynamo beyond its required speed.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in elevation showing a comparatively small dynamo connected to the wind wheel operated rod of a wind mill and operated thereby, in order to generate electricity to be stored in the storage battery. Fig. 2 is an enlarged sectional view through said connection, showing a portion of the dynamo. Fig. 3 is an enlarged side elevation of one of the gear wheels of said connection, showing the yielding device thereon.

Referring to the drawings, 1 designates a wind wheel operated rod, mounted in suitable bearings of a wind mill frame 2, and connected to the rod 1 as shown at 3 is a pitman 4, which in turn is connected at 5 to one end of a bar 6, which is loose upon a stub shaft 7. Also loose on the shaft 7 is a large spur gear 8, constructed preferably of aluminum, which is in mesh with a pinion 9 loose upon the shaft 10 of a comparatively small dynamo 11, there being suitable clutch connections between the pinion and the dynamo shaft for throwing the pinion in and out of gear with the shaft, said clutch connections being designated by the numeral 12. The dynamo has electrical connections 13 and 14 to the suitable storage battery 15, from which suitable wires or leads 16 and 17 extend, for conducting the electricity to any suitable location for consumption. The large spur gear is provided with an elliptical shaped rim 18 having a correspondingly shaped cam groove 19. Both ends of the cam groove 19 are curved inwardly toward the shaft 7 to form the pockets 20, in which the rollers 21, under ordinary or normal conditions engage. These rollers 21 are carried by pins 22 of the blocks 23, which are guided on the bar 6. Each block consists of two parts upon opposite faces of each end of the bar 6, said parts 24 have tongues 25 engaging through the slots 27 of each end of the bar 6, said parts being fastened together as shown at 29. Interposed between each end of each block and each end of each slot is a coil spring 30, of such tension and capacity as to hold the block substantially centered between the opposite end of the slot, that is, under ordinary or normal conditions, but under abnormal conditions, for instance, if the rod 1 is operating too fast, due to strong winds or a gale, the tension of the spring will be overcome, and the bar 6 will whirl around or revolve without operating the spur gear positively, therefore the dynamo will not revolve beyond its required speed, and in the case of the action of the springs being overcome, the rollers will follow the elliptical groove.

The invention having been set forth, what is claimed as new and useful is:—

In combination, a wind wheel operated reciprocating rod, a dynamo for generating electricity to be stored in a storage battery, said dynamo having a pinion on its shaft, a stub shaft, a spur gear loosely on said stub shaft and in mesh with the pinion, and yielding connections between the large spur gear and the rod adapted to be overcome incident to excessive reciprocation of the rod, said connections comprising an elliptically grooved rim carried on the spur gear, the opposite end of the groove being curved inwardly toward the stub shaft to form pockets, a bar loose on the stub shaft and having slots in its opposite end portions, blocks mounted in the slots and having spring tensioned means to hold them substantially centered in the slots, said blocks carrying anti-frictional means engaging said pockets of the groove, and adapted to follow the contour of the groove, when the bar revolves substantially independent of the spur gear, and when the tension of the spring tensioning means is overcome, and a pitman rod connection between the bar and the first rod.

In testimony whereof I have signed my name to this specification in the presence of two subscribing witnesses.

ARVID VICTOR JOHNSON.

Witnesses:
ARTHUR B. ATKINS,
GEO. L. SUTTON.

Copies of this patent may be obtained for five cents each, by addressing the "Commissioner of Patents, Washington, D. C."